(12) United States Patent
Denton et al.

(10) Patent No.: US 6,983,190 B2
(45) Date of Patent: Jan. 3, 2006

(54) METHOD FOR OPTIMIZING MATERIAL SUBSTITUTIONS WITHIN A SUPPLY CHAIN

(75) Inventors: Brian Trevor Denton, Winooski, VT (US); Robert John Milne, Jericho, VT (US)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 10/605,735

(22) Filed: Oct. 22, 2003

(65) Prior Publication Data

US 2005/0090921 A1    Apr. 28, 2005

(51) Int. Cl.
*G06F 19/00* (2006.01)
(52) U.S. Cl. .......................... 700/103; 700/97; 700/99; 700/106; 703/2; 703/7
(58) Field of Classification Search ............ 700/97–99, 700/101, 103–106; 705/29; 703/2, 7
See application file for complete search history.

(56) References Cited

U.S. PATENT DOCUMENTS

| | | | | |
|---|---|---|---|---|
| 5,630,070 A | * | 5/1997 | Dietrich et al. ............... 705/8 |
| 5,796,614 A | | 8/1998 | Yamada ...................... 700/106 |
| 5,825,651 A | * | 10/1998 | Gupta et al. ................. 700/103 |
| 5,943,484 A | * | 8/1999 | Milne et al. ................. 700/100 |
| 5,971,585 A | * | 10/1999 | Dangat et al. ............... 700/102 |
| 5,974,395 A | * | 10/1999 | Bellini et al. ................... 705/9 |
| 6,002,650 A | * | 12/1999 | Kuribayashi et al. ....... 700/117 |
| 6,049,742 A | * | 4/2000 | Milne et al. .................. 700/99 |
| 6,411,922 B1 | | 6/2002 | Clark et al. ................. 700/102 |
| 6,584,370 B2 | * | 6/2003 | Denton et al. .............. 700/107 |
| 2002/0055886 A1 | * | 5/2002 | Hinckley ...................... 705/26 |
| 2002/0095348 A1 | * | 7/2002 | Hiroshige et al. ............ 705/26 |
| 2002/0165701 A1 | * | 11/2002 | Lichtenberg et al. .......... 703/7 |
| 2002/0165805 A1 | * | 11/2002 | Varga et al. .................. 705/28 |
| 2003/0046191 A1 | * | 3/2003 | Ferreri et al. ................ 705/28 |
| 2003/0065415 A1 | * | 4/2003 | Hegde et al. ............... 700/100 |
| 2003/0171962 A1 | * | 9/2003 | Hirth et al. .................... 705/7 |

FOREIGN PATENT DOCUMENTS

WO    WO 02/060235 A2    8/2002

* cited by examiner

*Primary Examiner*—Paul Rodriguez
(74) *Attorney, Agent, or Firm*—Gibb I.P. Law Firm, LLC; Richard M. Kotulak, Esq.

(57) ABSTRACT

Disclosed is a method and system for efficiently modeling the situation where a product manufactured within a multi-stage manufacturing system has components upstream in the supply chain which may substitute for one another. The invention selectively permits substitutions based on rules associated with downstream operations or customer shipments. One component may substitute for another provided that the assembly consuming the component belongs to a certain set of assemblies. The invention also encompasses a method by which this can be integrated into a production planning system based on a linear programming (LP) model.

21 Claims, 5 Drawing Sheets

Before Process/PN Splitting

After Process/PN Splitting

METHOD FOR OPTIMIZING MATERIAL SUBSTITUTIONS WITHIN A SUPPLY CHAIN

BACKGROUND OF INVENTION

1. Field of the Invention

The invention generally relates to a system and method for integrating the consideration of component substitution rules within an advanced planning system for considering established planning objectives to compute an optimal production plan. More specifically, the present invention relates to computer implemented decision support systems for determining a production plan of feasible production starts, where the plan integrates the consideration of material substitutions with production constraints, and operational objectives. General methodologies within this field of study include advanced planning systems, optimization and heuristic based algorithms, constraint based programming, and simulation.

2. Description of Related Art

The ability to substitute one part for another in a manufacturing process is an aspect of production planning that is common to many different types of industry supply-chains. For example, in the steel industry higher grade steels can be substituted for lower grade steels (and vice versa). Similarly, in the semiconductor manufacturing industry faster processors can be substituted for slower processors (referred to as down-binning) at various points in the manufacturing process. Accounting for these types of opportunities helps in determining optimal supply-chain planning decisions. Basic methods for handling these simple substitutions have been described in U.S. Pat. No. 5,971,585, which is incorporated herein by reference.

To determine an optimal supply chain plan, it aids to consider the potential substitution opportunities since this may dramatically alter the optimal plan. For example, the ability to substitute one part for another can mean that excess unwanted inventory can be utilized rather than planning new production starts of another part. This results in more efficient utilization of capacity resources and ultimately impacts supply-chain metrics such as inventory position, on-time-delivery, and capacity utilization.

SUMMARY OF INVENTION

The invention disclosed here is implemented in the linear programming application of software that is used for centrally planning production starts, interplant shipments, customer shipments, material substitutions, and inventory. This invention comprises a method and system for efficiently modeling the situation where a product manufactured within a multi-stage manufacturing system has components upstream in the supply chain which may substitute for one another. The invention selectively permits substitutions based on rules associated with downstream operations or customer shipments. In other words, one component may substitute for another provided that the assembly consuming the component belongs to a certain set of assemblies. The invention also encompasses a method by which this can be integrated into a production planning system based on a linear programming (LP) model.

The invention can be embedded in a supply chain optimization planning software tool which uses linear programming, and other nonlinear and discrete optimization based algorithms, to determine an optimal production plan. The software tool includes, for example, a preprocessor, model manager, linear program solver, postprocessor, and reporting function. The present invention would reside in the preprocessing and model manager stages and be used to identify a set of necessary variables and constraint equations that need to be added to the linear program to model material substitutions with dependencies downstream in the supply chain. The invention further identifies (in the preprocessing stage) which of the allowable material substitutions require special constraint equations to block impermissible material substitutions, and which require normal handling using material balance equations.

The invention provides a method for modeling complex substitutions in an efficient manner that can be implemented for solving practical enterprise level production planning problems. It includes a system for storing the necessary information for modeling assembly dependent substitutions, and a method for sorting substitution data into two sets of records (a) a set requiring explicit treatment via this new method for modeling substitutions and (b) a set that can be handled using prior art methodology. This method is based on scanning material substitution input data and bill of material (BOM) data to determine cases ((b) above) in which a given substitution of component part numbers (PNs) is valid for all possible parent assemblies. The invention also includes a method for efficiently computing a minimal set of additional variables and constraints that must be added to the mathematical programming model to block invalid substitutions. Further, the invention includes a solution of the resulting mathematical program and outputs the resulting substitution information in a form that is suitable for production planning purposes.

The invention further embodies a method for exploiting the interdependencies among rules defining allowable material substitutions to compress the mathematical program size. One aspect of this method is generating variables and constraint equations such that the resulting mathematical model can be solved efficiently. The invention minimizes the number of additional variables and constraint equations that need to be added to the mathematical program to achieve a feasible and optimal solution.

DETAILED DESCRIPTION

Figure 1:
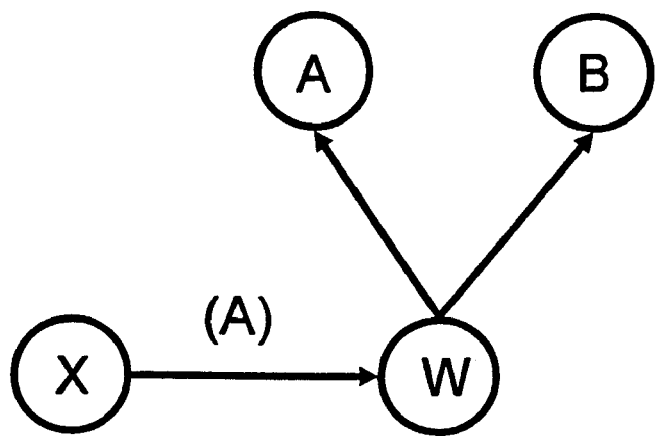
FIG. 1: Illustration of an assembly dependent material substitution rule.

As explained above, the ability to substitute one part for another results in more efficient utilization of capacity resources and ultimately impacts supply-chain metrics such as inventory position, on-time-delivery, and capacity utilization. In order to consider these substitution opportunities in the presence of downstream dependencies, the invention blocks undesirable substitutions, something which no conventional system is able to do.

The invention involves the consideration of specialized substitutions which have dependencies on rules relating to down-stream operations or customer shipments in the supply chain. For example, in some manufacturing environments material substitutions are only permitted if they are used to build an assembly that falls into a certain class of assemblies. By way of example, two assemblies, A and B, which are assembled using some component, C, may have different rules regarding allowable substitutions. When assembling A it may be feasible to substitute an alternate component, X, however, when assembling B this type of substitution may be impermissible. Thus, the invention provides an improved production planning method that identifies substitute components that can be used in place of original components in assemblies. The substitute components perform the same function, but may be structurally different or have different operating/performance characteristics when compared to the original components they replace. The substitute components are used in place of original components to increase manufacturing efficiency. The invention provides restrictions on use of the substitute components to specific subsets of assemblies.

Thus, with the invention a substitute component may be an appropriate substitute for an original component in a first assembly and may not be an appropriate substitute for the same original component in a second assembly. These restrictions can be based on either client requirements (e.g., client preferences or shipping constraints) or engineering constraints (e.g., physical design, operational characteristics, performance characteristics, etc.). Real manufacturing rules extend these kinds of rules to much more complex cases by considering multiple assembly types, multiple substitutable components, and relationships between substitution rules for different assemblies. Thus, the invention considers these rules to compute optimal production plans.

One method for handling material substitutions which does not consider down-stream limitations uses unrestricted part number (PN) substitutions using decision variables, $S(X,Y,t,a)$. The indexes are for the substituting part number, X, the substituted part number, Y, the time period in which the substitution is made, t, and the plant location where the substitution is made, a. This unrestricted type of substitution is modeled by including the above variables in the relevant material balance equations in a mathematical programming formulation of the production planning problem. The material balance equation for part number X would subtract the above variable from inventory in period t at plant a, and the equation for part number Y would add the variable in period t at plant a, thus modeling the substitution flow of part numbers when necessary, and subject to user defined cost penalties in the objective function.

A more complex type of material substitution which is not covered by the method described above is the situation in which, for example, part number X may substitute for part number Y only in situations where part number Y is a component in a specific subset of assembly part number(s) (referred to as the parent set, PS). FIG. 1 illustrates this by way of an example in which there are two assemblies part numbers, A and B, both which require a component part number, W. When building A it is permissible to substitute component part number X for W, however, when building B it is not permissible (in FIG. 1 the "(A)" on the arc from X to W denotes this). The method for addressing this situation is to create new substitution decision variables and additional constraints to "block" impermissible substitutions:

$S(X,Y,P,t,a)$=the quantity of PN X substituted for PN Y during time period t at location a when used to manufacture parent PN P which is an element of the subset PS.

$P(P,t,a)$=the production start of PN P during time period t at location aConstraint SUM_{all X that can sub for Y when Y's parent assembly is P} $S(X,Y,P,t,a)<=P(P,t,a)$.

This constraint limits the substitution quantity to be less than or equal to the quantity of the parent assembly production start in period t at plant a. Adding these constraints to an existing mathematical programming model of the supply chain allows for explicit consideration of these material substitution rules. Thus, the invention formulates the restrictions as mathematical expressions for each substitute component. The mathematical expressions comprise linear mathematical statements.

The invention extends the application of the method to other generalizations of the problem. For instance, the nature of the constraint equations above implicitly assumes that each parent assembly PN requires a single unit of component part number to be built, however, this can be generalized to any quantity by adding a coefficient in front of the variable on the right hand side of the equation. Thus, the mathematical expressions provide for multiple substitutions of the substitute components for original components in the assemblies. The new equation would be:

$$\text{SUM\_}\{\text{all } X \text{ that can sub for } Y \text{ when } Y\text{'s parent assembly is } P\}S(X,Y,P,t,a)<=QP(P,t,a)$$

Where the new coefficient Q represents the quantity of components Y (or X) to build one unit of parent assembly part number P. Similarly, the invention can also be easily extended to allow for the possibility of material substitution not being in the ratio 1:1. Industry examples in which this is true include the manufacture of servers in which memory chips are used in the assembly and several smaller memory chips may substitute for one large chip (e.g. 4×256 MB for 1 GB). In this case a coefficient is put in front of the S variable as it appears in a material balance equation in the mathematical program.

Figure 2:
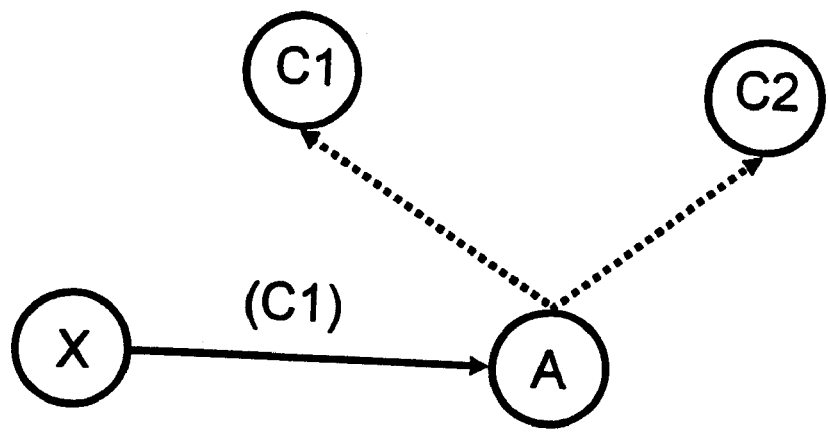
FIG. 2: Illustration of a customer shipment based material substitution rule.

FIG. 2 illustrates an example in which the substitution restrictions are specified based on shipping rules. In this example C1 and C2 represent customers who accept shipments of finished assembly part number A and the dashed arcs denote shipping routes. In the example customer C1 will accept part number A assembled via substitution of component part number X, however, customer C2 will not accept shipments of part number A via substitution of component X. To handle these restrictions based on allowable shipments the constraint equation is altered to the following:

$$\text{Constraint: SUM\_}\{\text{all } X \text{ that can sub for } A \text{ when } A \text{ is destined for customer } C\}S(X,A,C,t,a)<=F(A,C,t,a)$$

Where, in the above equation, variable $F(A,C,t,a)$ represents the quantity of finished product part number A shipped to customer C in period t from plant a.

Figure 3:
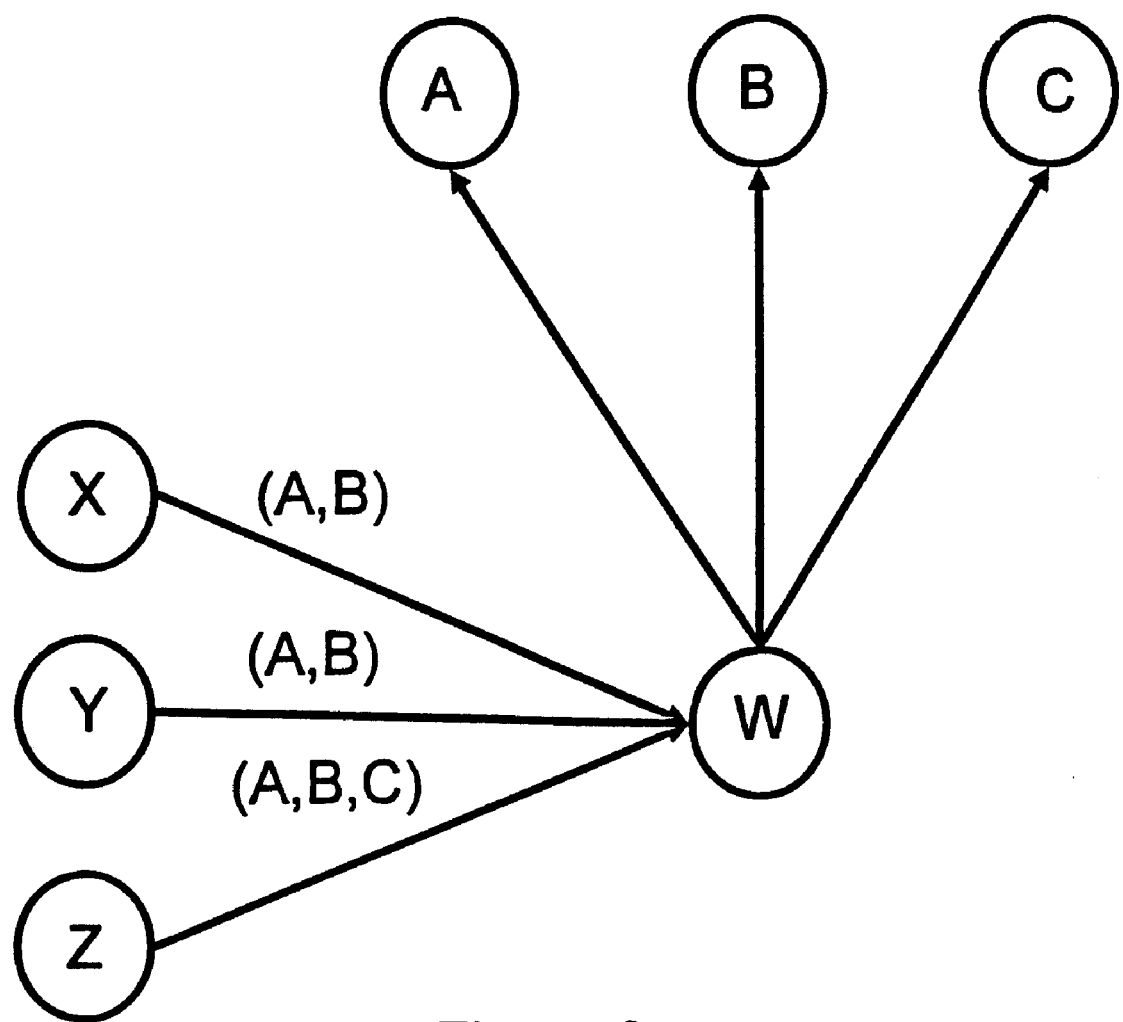
FIG. 3: Illustration of a multiple part assembly dependent material substitution rule with substantial overlap of parent sets.

The invention further refines the method to mitigate the increase in decision variables and constraints by exploiting structural properties of the constraint set. FIG. 3 illustrates this with an example in which part numbers X and Y may substitute for part number W only when part number W is consumed by parent assemblies A or B, and that part number Z may substitute for part number W only when part number W is consumed by parent part number assemblies A, B, or C. The initial situation described above would have added the following constraints and variables:

$$S(X,W,A,t,a)+S(Y,W,A,t,a)+S(Z,W,A,t,a)<=P(A,t,a)$$

$$S(X,W,B,t,a)+S(Y,W,B,t,a)+S(Z,W,B,t,a)<=P(B,t,a)$$

$$S(Z,W,C,t,a)<=P(C,t,a)$$

The invention recognizes and exploits the heavy intersection between the parent sets of the substituting PNs, X and Y. In other words, when possible, the invention combines mathematical expressions of components that have the same restrictions. As a result, the invention would model this situation with the following tighter set of constraints:

$$S(X,W,AB,t,a)+S(Y,W,AB,t,a)+S(Z,W,AB,t,a)<=P(A,t,a)+P(B,t,a)$$

$$S(Z,W,C,t,a)<=P(C,t,a)$$

where AB represents the part numbers A and B. For large-scale problems found in practice this reduction in constraints can result in substantial improvement in runtime required for solving the resulting linear program.

Figure 4:
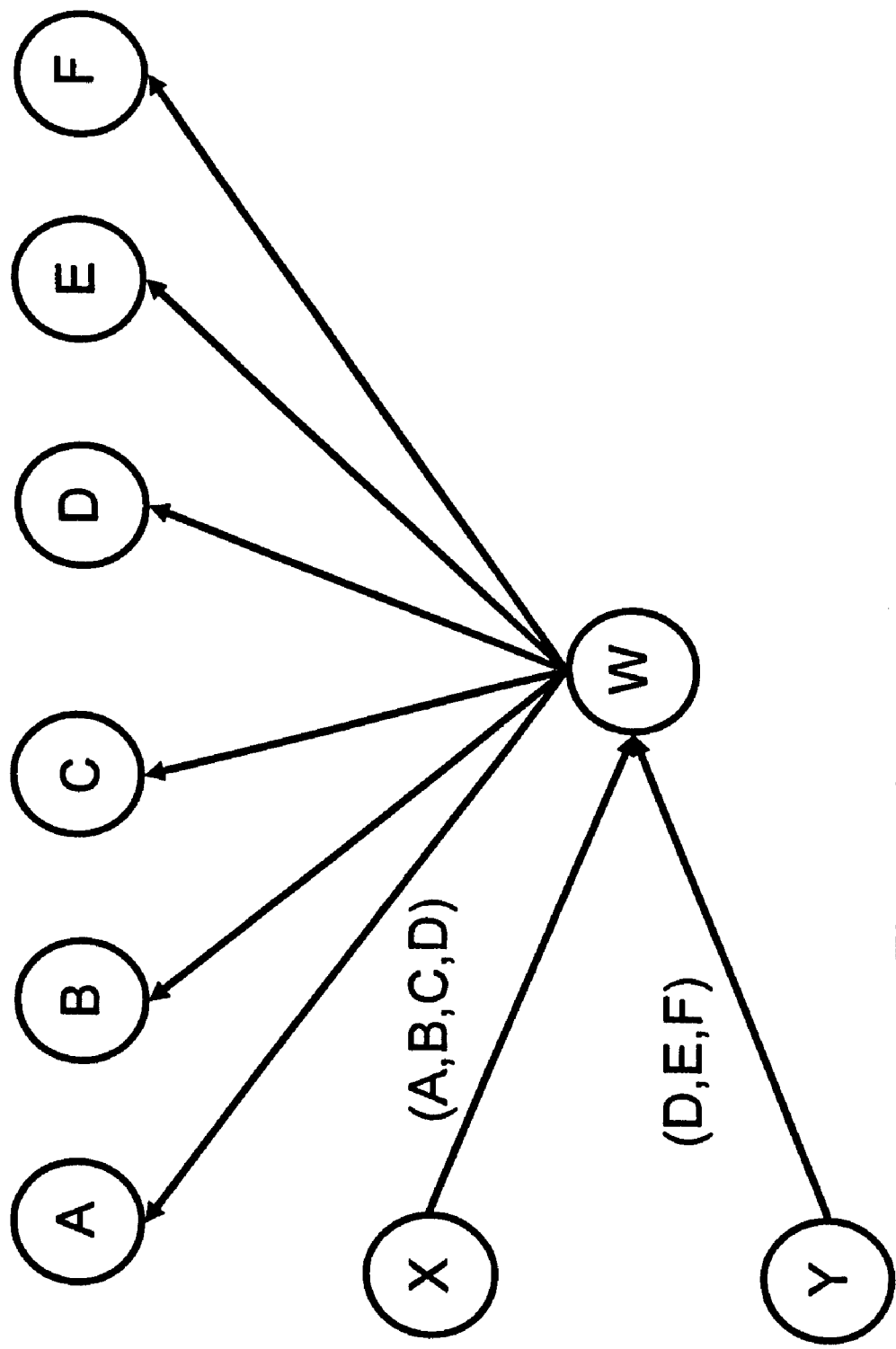
FIG. 4: Illustration of a multiple part assembly dependent material substitution rule with substantial disjointedness of parent set.

In addition to exploiting heavy intersections between substituting part numbers, the invention also exploits disjointness (or dissimilarities) between the parent sets. FIG. 4 illustrates a case in which part number X may substitute for part number W only when part number W is consumed by parent assemblies A, B, C, or D, and that part number Y may substitute for part number W only when part number W is consumed by parent assemblies D, E, or F. The initial situation would thus have the following additional constraints and variables:

$$S(X,W,A,t,a)<=P(A,t,a)$$

$$S(X,W,B,t,a)<=P(B,t,a)$$

$$S(X,W,C,t,a)<=P(C,t,a)$$

$$S(X,W,D,t,a)+S(Y,W,D,t,a)<=P(D,t,a)$$

$$S(Y,W,E,t,a)<=P(E,t,a)$$

$$S(Y,W,F,t,a)<=P(F,t,a)$$

The refined invention recognizes and exploits the heavy disjointness of the parent sets of substituting part numbers and adds the following equivalent reduced set of variables and constraints:

$$S(X,W,ABC,t,a)<=P(A,t,a)+P(B,t,a)+P(C,t,a)$$

$$S(X,W,D,t,a)+S(Y,W,D,t,a)<=P(D,t,a)$$

$$S(Y,W,EF,t,a)<=P(E,t,a)+P(F,t,a)$$

In this small example, the refinement results in a reduction of the number of constraints by 50%. In practical large-scale instances of the LP model the potential reduction can be more substantial. Since solution times for linear programming problems are typically nonlinear in the number of variables and constraints this results in significant savings in computation time.

The disclosed method also includes a preprocessing step which sorts material substitution rules into two groups (a) ones which require application of variables and constraints as described in the above method and (b) ones which can be handled using straightforward substitution logic in which no new variables and constraints are required. In practice rules for material substitutions may specify allowable substitutions rather than ones that are not allowed. The type (b) group of rules can be identified when rules are specified for all downstream dependencies on operations and shipping variables. For example, for the case in FIG. 1 if assembly part numbers A and B have rules specifying that they both allow substitution of component part numbers X and Y, and there are no other assembly part numbers that use component part number W, then although substitution rules are specified, they do not preclude any of the possible substitutions, and therefore no new variables or constraints need to be added to block illegal substitutions. Type (b) situations in which substitutions are not precluded can be identified by scanning the bill of materials (BOM) and shipping route data to evaluate the assembly options and then compare them to the allowable substitutions defined by the substitution rules data. When the substitution rules define that a proper subset of parent part numbers allow a particular solution then the associated substitution rule records are specified as type (a). On the other hand, when the substitution rules define that the complete set of parent part numbers may benefit from the substitution, then the rules are classified as type (b).

The following pseudo code illustrates the algorithm used for computing the variables and constraints for the records in set (a) after the separation of the two sets has occurred. For ease of exposition the pseudo code ignores time effective changes in parent part number relationships, however, incorporating this aspect would be obvious to one practiced in the art. In the below description SUB_PN and PARENT_PN are the substituting part numbers and the parent part numbers for a given substituted component part number PN respectively. The pseudo code relates to the case of assembly dependent substitutions, however, converting it to the analogous case of shipping dependencies described above would be straightforward to one practiced in the art.

```
For each PN and PLANT{
    //Initialize variables
    Let I denote the set of SUB_PNs at PLANT which
substitute for PN, and i=1, . . . , m index the elements of the
set
    Let J denote the set of PARENT_PNs at PLANT for
which at least one SUB_PN may substitute for PN when
PARENT_PN is assembled, and j=1, . . . , n index the
elements of the set
    Let K(i) denote the set of PARENT_PNs for which
SUB_PN I i may substitute for PN at PLANT
    //Loop through all SUB_PNs
    For(all elements of set I from i=1 to m){
    While(set K(i) is nonempty){
    Initialize set P=set K(i)
    Intialize set S to contain the single element i
    //Generate heavy nonempty intersection of parent sets of
SUB_PN i
    For(all elements of set I from t=i+1 to m){
    If(intersection of set P with set K(t) non-empty){
    Set P=the intersection of set P with K(t)
    Add element to set S
    Add element t to set S
    }
    }
    //Remove parents in P from all SUB_PN parent sets
    Set J_temp = Set J
    n_temp=n
    For(all elements of set J from j =1 to n){
    I f(j is an element of P){
    remove j from all sets K(t) for t=i to m
```

-continued

```
        n_temp=n_temp-1
        Remove j from set J_temp and reindex J_temp from 1 to
        n_temp
        }
    }
    Set J = Set J_temp
    n = n_temp
    //Write intersection data to output files for generating LP
    model constraints
    Write_constraint_to_file(PN,PLANT,S,P)
} //end while loop
    }
  }
```

The function write_constraints_to_file( ) uses one selected PARENT_PN from set P to represent the "PARENT_GROUP" and writes records representing the appropriate constraints (set S defines "S" variables and set P defines "P" variables in the notation in the examples above) to incidence files which may later be used to construct the complete LP model. The file names and defined fields are:

The function write_constraints_to_file( ) uses one selected PARENT_PN from set P to represent the "PARENT_GROUP" and writes records representing the appropriate constraints (set S defines "S" variables and set P defines "P" variables in the notation in the examples above) to incidence files which may later be used to construct the complete LP model. The file names and defined fields are:

1) SUBPARENT_S.TAB:
PN   SUB_PN   PARENT_GROUP   PLANT   FROM_PERIOD   TO_PERIOD   SUB_QTY_PER   COST

2) SUBPARENT_P.TAB
PN   PARENT_PN   PARENT_GROUP   PLANT   FROM_PERIOD   TO_PERIOD   QTY_PER

In SUBPARENT_S.TAB the SUB_QTY_PER field is the date effective quantity of SUB_PN that substitutes for one unit of part number, and the COST is the date effective cost from the PRFTIN.SUBPARENT file which represents the penalty value applied for the associated substitution variable in the mathematical programming model to which the generated constraints are added. In the SUBPARENT_P.TAB file the QTY_PER field is obtained from the PRFTIN.BOM record that has assembly PARENT_PN, component part number, and matching PLANT and time effective dates. Since the data is time effective the interval in the time horizon for which it holds is defined by the fields FROM_PERIOD and TO_PERIOD in SUBPARENT_S.TAB and SUBPARENT_P.TAB. Following are simplified examples of the structure of these two files for the case described in FIG. 3. For purposes of the example it is assumed that there is a single plant, LOC. It is further assumed that the substitution rules are static in this example and that all the time effective parameters remain the same through a planning horizon of 50 time periods (e.g. days).

In SUBPARENT_S.TAB the SUB_QTY_PER field is the date effective quantity of SUB_PN that substitutes for one unit of part number, and the COST is the date effective cost from the PRFTIN.SUBPARENT file which represents the penalty value applied for the associated substitution variable in the mathematical programming model to which the generated constraints are added. In the SUBPARENT_P.TAB file the QTY_PER field is obtained from the PRFTIN.BOM record that has assembly PARENT_PN, component part number, and matching PLANT and time effective dates. Since the data is time effective the interval in the time horizon for which it holds is defined by the fields FROM_PERIOD and TO_PERIOD in SUBPARENT_S.TAB and SUBPARENT_P.TAB. Following are simplified examples of the structure of these two files for the case described in FIG. 3. For purposes of the example it is assumed that there is a single plant, LOC. It is further assumed that the substitution rules are static in this example and that all the time effective parameters remain the same through a planning horizon of 50 time periods (e.g. days).

1) SUBPARENT_S.TAB:

| PN | SUB_PN | PARENT_GROUP | PLANT | FROM | TO | SUB_QTY_PER | COST |
|----|--------|--------------|-------|------|----|-----------|------|
| W  | X      | A            | LOC   | 1    | 50 | 1.0         | 1.0  |
| W  | Y      | A            | LOC   | 1    | 50 | 1.0         | 1.0  |
| W  | Z      | A            | LOC   | 1    | 50 | 1.0         | 1.0  |
| W  | Z      | C            | LOC   | 1    | 50 | 1.0         | 1.0  |

2) SUBPARENT_P.TAB:

| PN | PARENT_PN | PARENT_GROUP | PLANT | FROM | TO | QTY_PER |
|----|-----------|--------------|-------|------|----|---------|
| W  | A         | A            | LOC   | 1    | 50 | 1.0     |
| W  | B         | A            | LOC   | 1    | 50 | 1.0     |
| W  | C         | C            | LOC   | 1    | 50 | 1.0     |

The function write_constraints_to_file( ) in the above pseudo code uses one randomly selected part number from intersect( ) to represent the PARENT_GROUP and writes records representing the appropriate constraints to an incidence file which may later be read to construct the complete LP model. In the above example, the part number A was selected to define the PARENT_GROUP containing part numbers A and B.

Once the necessary constraints have been defined they can be augmented into the mathematical programming formulation. The resulting problem can then be solved using existing methods (e.g., known prior art methods for solving linear programs).

Figure 5:
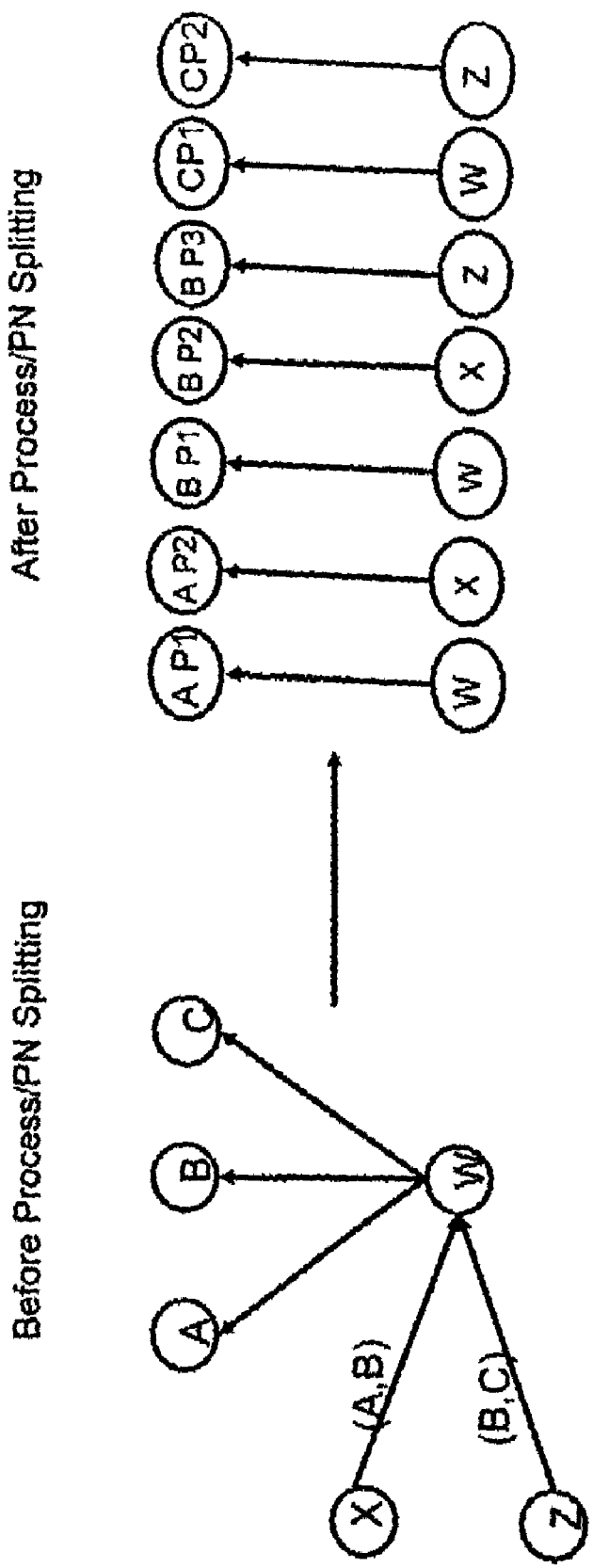
FIG. 5: Illustration of an alternative method for modeling assembly dependent material substitutions based on the use of multiple build processes, and component PN splitting.

An alternative method for modeling material substitutions involves extensions of prior art reported in U.S. Pat. No. 5,943,484, which is incorporated herein by reference. The referenced patent describes a method in which assembly part numbers can be split by indexing the same part number with different assembly processes. Such a method could be extended to consider multiple build options representing different substitution possibilities. FIG. 5 illustrates this concept. In the example, part number A occurs in only one parent set, thus it is split into two processes, P1 and P2, where the first represent building assembly part number A using part number W and the second represents building part number A with substitutable part number X. In the example, assembly part number B occurs in both parent sets and thus requires that 3 processes be specified, P1, P2, and P3, representing building part number B using component part number W, X and Z respectively. This concept of multiple processes and part number splitting can be generalized to apply to the same cases described for the above method.

Figure 6:
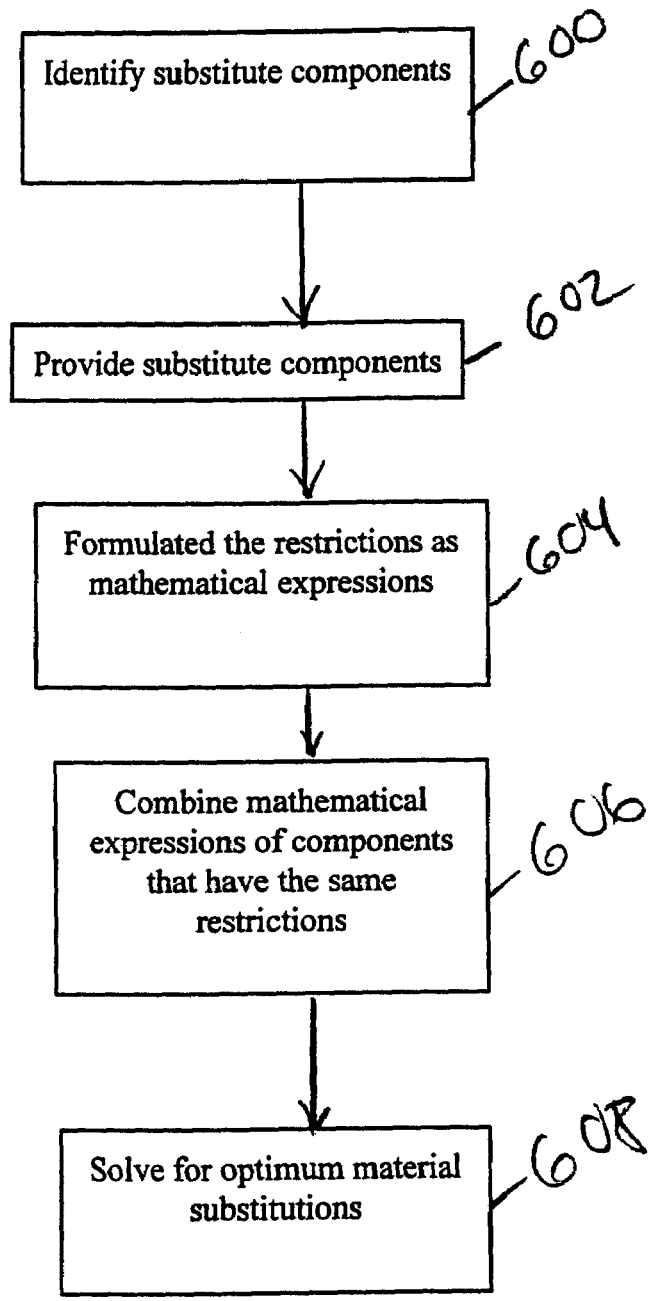
FIG. 6: Flowchart showing processing of the invention.

As shown in FIG. 6, the invention provides an improved production planning method that identifies substitute components (600) that can be used in place of original components in assemblies. The substitute components perform the same function, but may be structurally different that the original components they replace, and are used in place of original components to increase manufacturing efficiency.

The invention provides restrictions on use of the substitute components (602) to subsets of assemblies. Thus, with the invention a substitute component may be an appropriate substitute for an original component in a first assembly and may not be an appropriate substitute for the same original component in a second assembly. These restrictions can be based on either client requirements (e.g., client preferences or shipping constraints) or engineering constraints (e.g., physical design, operational characteristics, performance characteristics, etc.).

The invention formulates the restrictions as mathematical expressions (604) for each substitute component. The mathematical expressions provide for multiple substitutions of the substitute components for original components in the assemblies. Further, the mathematical statements comprise linear mathematical statements. When possible, the invention combines mathematical expressions and variables of components that have either related or the same restrictions (606).

The invention solves for optimum material substitutions (608) using these mathematical statements. The mathematical expressions set the quantity of substitutions to be no greater than a multiple of the number of associated assemblies.

The present invention can be implemented on any number of systems, such as an IBM P690 server with AFS for data storage and using the AIX operating system. The steps for implementing the present invention are preferably programmed in C/C++. It would be understood by those of ordinary skill in the art, however, that the represent invention is not limited to the above implementation and is independent of the computer/system architecture. Accordingly, the present invention may equally be implemented on other computing platforms, programming languages and operating systems, and also may be hard-wired into a circuit or other computational component.

The present invention provides a computationally efficient means of modeling assembly dependent substitutions applicable to discrete parts and process manufacturing industries. Applicable discrete parts industries would include, for example, the manufacturing of computer hard disk drives, machine tools, automotive, etc. Applicable process manufacturing industries would include semiconductors, steel, pharmaceutical, and petroleum. The invention also provides the capability to efficiently model restrictions on customer dependent substitutions and thus has applicability to distribution networks.

While the invention has been described in terms of the preferred embodiments, those skilled in the art will recognize that the invention can be practiced with modification within the spirit and scope of the appended claims.

What is claimed is:

1. A computer implemented production planning method comprising:
   identifying substitute components that can be used in place of original components in assemblies;
   providing restrictions on use of said substitute components to subsets of assemblies, such that a substitute component may be substituted for an original component in a first assembly and may not be substituted for said original component in a second assembly, wherein said restrictions allow for multiple substitutions of said substitute components for said original components in said first assembly; and,
   computing an optimal production plan in which said first assembly is produced with said multiple substitutions, wherein said plan is optimized for manufacturing efficiency.

2. The method in claim 1, wherein said restrictions are based on one of client requirements and engineering constraints.

3. The method in claim 1, wherein said substitute components perform the same function and are structurally different.

4. A computer implemented production planning method comprising:
   identifying substitute components that can be used in place of original components in assemblies;
   providing restrictions on use of said substitute components to subsets of assemblies, such that a substitute component may be substituted for an original component in a first assembly and may not be substituted for said original component in a second assembly;
   formulating said restrictions as mathematical expressions for each substitute component, wherein said mathematical expressions allow for multiple substitutions of said substitute components for said original components in said first assembly;
   solving for optimum material substitutions using said mathematical expressions; and,
   computing an optimal production plan in which said first assembly is produced with said multiple substitutions, wherein said plan is optimized for manufacturing efficiency.

5. The method in claim 4, wherein said restrictions are based on one of client requirements and engineering constraints.

6. The method in claim 4, wherein during said solving process said mathematical expressions set the quantity of substitutions to be no greater than a multiple of the number of associated assemblies.

7. The method of claim 4, wherein said mathematical expressions comprise linear mathematical expressions.

8. The method in claim 4, wherein said substitute components perform the same function and are structurally different.

9. A computer implemented production planning method comprising:
   identifying substitute components that can be used in place of original components in assemblies;
   providing restrictions on use of said substitute components to subsets of assemblies, such that substitute components may be substituted for an original component in a first assembly and may not be substituted for said original component in a second assembly;
   formulating said restrictions as mathematical expressions for each substitute component, wherein said mathematical expressions allow for multiple substitutions of said substitute components for said original components in said first assembly;
   combining mathematical expressions of components that have the same restrictions; and,
   computing an optimal production plan in which said first assembly is produced with said multiple substitutions, wherein said plan is optimized for manufacturing efficiency.

10. The method in claim 9, wherein said restrictions are based on one of client requirements and engineering constraints.

11. The method in claim 9, further comprising solving for optimum material substitutions using said mathematical expressions,
   wherein during said solving process said mathematical expressions set the quantity of substitutions to be no greater then a multiple of the number of associated assemblies.

12. The method of claim 9, wherein said mathematical expressions comprise linear mathematical expressions.

13. The method in claim 9, wherein said substitute components perform the same function and are structurally different.

14. The method in claim 9, further comprising removing said restrictions for components that are acceptable to all assemblies.

15. A computer implemented production/distribution planning method comprising:
   identifying substitute part numbers that can be used in place of original part numbers;
   providing restrictions on use of said substitute part numbers to subsets of customers, such that a substitute part number may be substituted for an original part number when used by a first customer and may not be substituted for said original part number when used by a second customer;
   formulating said restrictions as mathematical expressions for each substitute part number; and
   solving for optimum material substitutions using said mathematical expressions.

16. The method in claim 15, further comprising computing an optimal production plan in which said substitute part number is substituted for said original part number for said first customer, wherein said plan is optimized for manufacturing efficiency.

17. The method of claim 16, wherein said mathematical expressions allow for multiple substitutions of said substitute part numbers for said original part numbers.

18. The method of claim 17, wherein said process of computing an optimal production plan further comprises computing an optimal production plan having said multiple substitutions to optimize manufacturing efficiency.

19. The method of claim 15, wherein said restrictions are based on one of client requirements and engineering constraints.

20. The method in claim 15, wherein said substitute part numbers perform the same function and are structurally different than said original part numbers.

21. The method of claim 15, wherein said mathematical expressions comprise linear mathematical expressions.

* * * * *